March 29, 1938. E. F. M. SPEIDEL 2,112,231
CONTAINER
Filed May 23, 1936 5 Sheets-Sheet 1
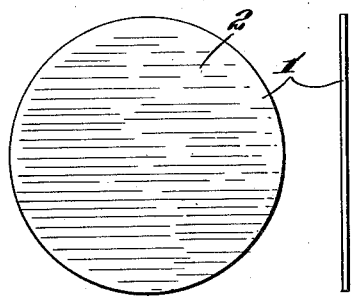
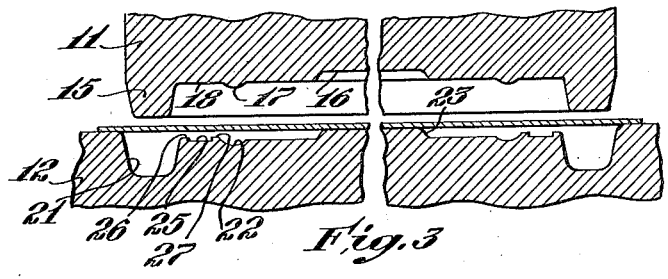
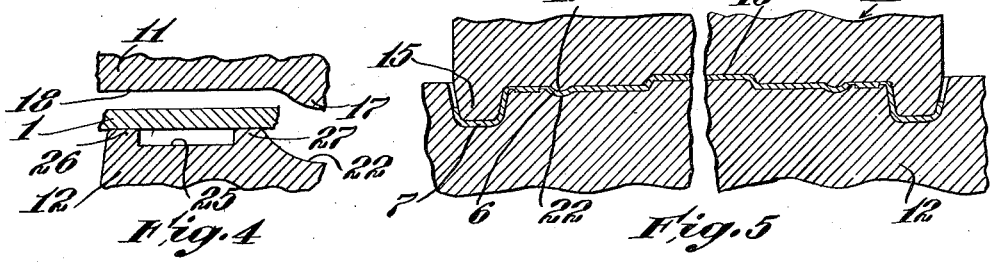
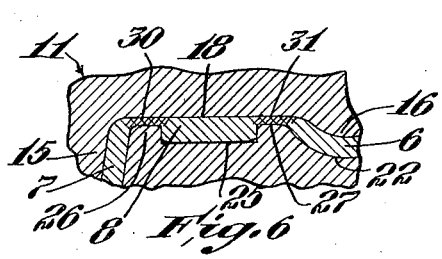
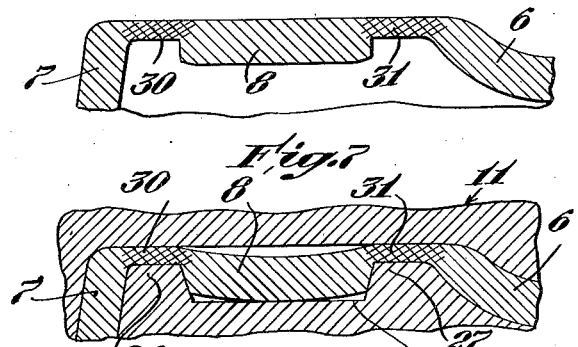
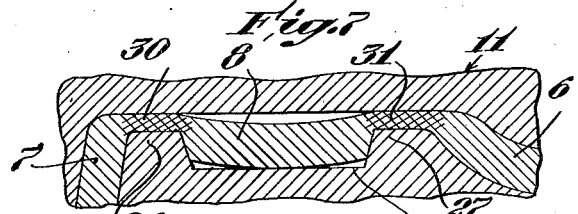
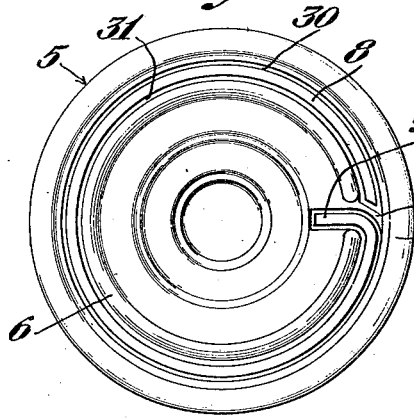
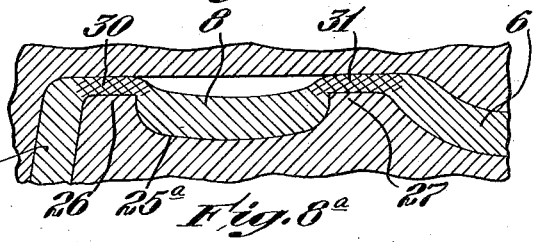
Inventor
Edwin F. M. Speidel
by Roberts, Cushman & Woodberry
att'ys

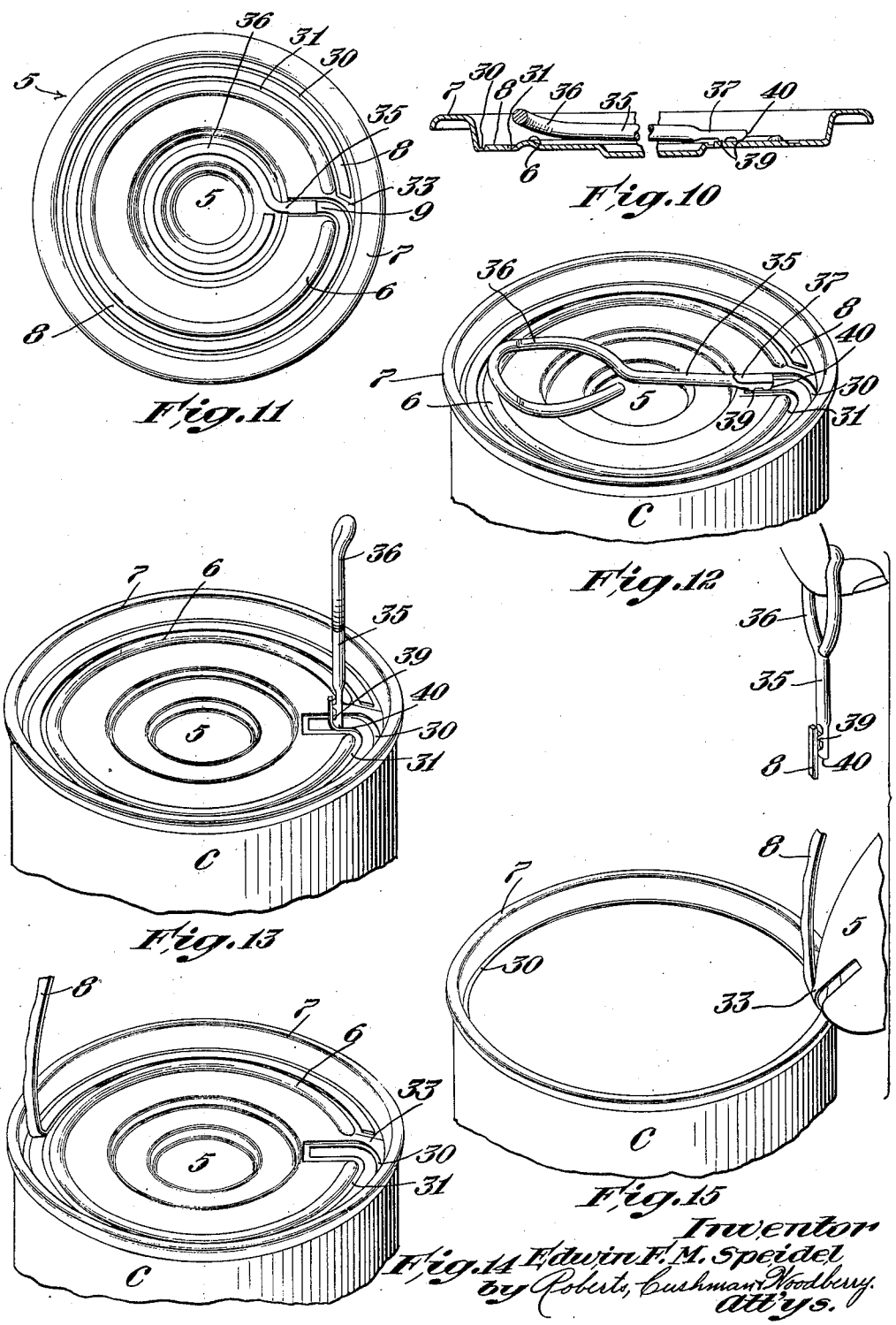

March 29, 1938. E. F. M. SPEIDEL 2,112,231
CONTAINER
Filed May 23, 1936 5 Sheets-Sheet 3

Inventor
Edwin F. M. Speidel
by Roberts, Cushman & Woodbury
Att'ys.

March 29, 1938. E. F. M. SPEIDEL 2,112,231
CONTAINER
Filed May 23, 1936   5 Sheets-Sheet 4

Inventor
Edwin F. M. Speidel
by Roberts, Cushman & Woodberry
att'ys.

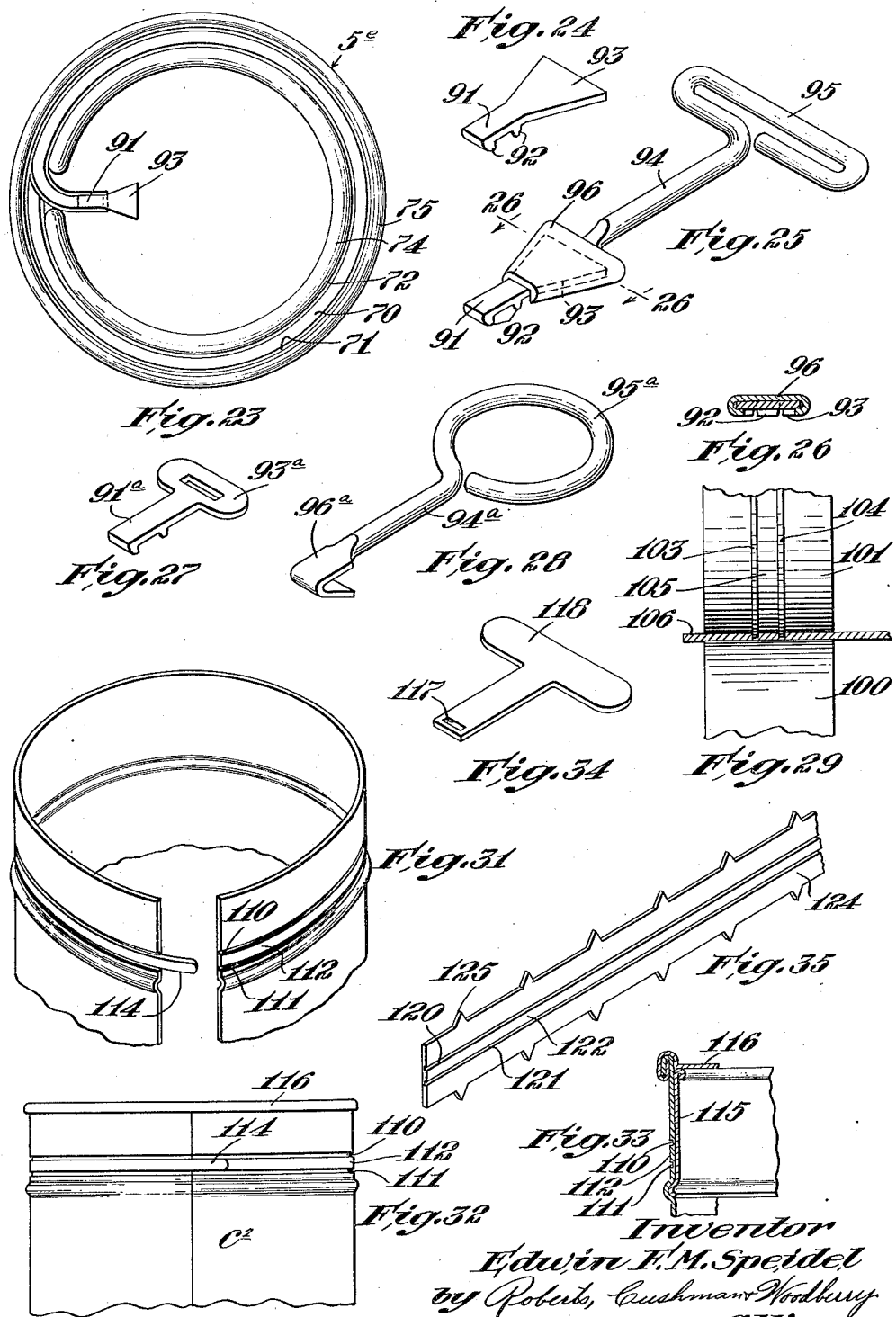

Patented Mar. 29, 1938

2,112,231

UNITED STATES PATENT OFFICE 2,112,231

CONTAINER

Edwin F. M. Speidel, Cranston, R. I.

Application May 23, 1936, Serial No. 81,445

4 Claims. (Cl. 220—54)

This invention relates to containers of the type having a tear strip or section adapted to be torn or broken away in order to open the container.

In manufacturing containers of the aforementioned type it is the practice to provide score lines to define a strip which is to be torn away, and to attach to one end of the tear strip a key by means of which the strip may be torn away from the body portion of the cover or wall of the container by turning the key. The score lines defining the tear strip are always formed by a cut or shear which extends part way into the material of the cover or wall of the container, and as a result the cover or wall portion of the container not only is provided with a line having a tearing strength which has been reduced an amount proportional to the depth of the cut or shear, but also the bursting and tensile strength of the material of the cover or wall of the container is likewise reduced correspondingly.

In all such methods of treatment there is no appreciable alteration of the temper or physical characteristics of the material, the treatment merely being to cut into the physically unaltered material so as to provide a weakened line of tear. Because of the reduction in the bursting and tensile strength of the material, great care must be taken in order to produce a cut or incision of the proper depth, since any irregularity in the setting of the dies or the stamping press may cause the cutting edge of the die to penetrate unevenly, or too deeply, or not deeply enough, thereby producing an imperfection in the container. To avoid the danger of too much weakening of the can, it is common practice to provide a cut or shear of less depth than the optimum, and since this results in substantial resistance to tearing at the score line, it is usually necessary to provide a key or like means capable of acting as a lever to overcome the resistance of the tear strip.

A further disadvantage in providing cut score lines by means of dies, resides in the fact that it is necessary periodically to resharpen the cutting edges of the dies in order to insure the proper depth and uniformity of cut, and this resharpening presents many difficulties in order again to obtain sharp edges at an even level.

The principal objects of this invention are to overcome the aforementioned deficiencies of the prior art and to provide a container having a tear strip or section defined by an area or zone having a tensile and bursting strength which is not appreciably less, if any, than that of the original metal, and which has a greater density and hardness and a substantially lower tearing strength; and to provide a commercially satisfactory method of and means for forming a tear strip or section on the cover or wall portion of a container.

I have found that when a piece of relatively soft metal, such for example as sheet iron, is subjected to a high degree of compression, such as is produced in coining, stamping, rolling, cold forging, and the like operations, the physical characteristics of the metal are materially altered, and as a result there is not only an appreciable increase in density and hardness, without objectionable loss of tensile strength or bursting strength, but also a substantial decrease in the tearing strength of the altered metal. In accordance with the present invention, the cover or wall of a metal container is provided with a tear strip or section which may be of any desired shape and which is defined by an area or zone of compressed metal, produced either by coining, stamping, rolling or other operation which is effective to alter the physical characteristics of the metal in a manner which results in decreasing its tearing strength, without effecting an appreciable decrease, if at all, in the tensile and bursting strength of the metal.

One of the great advantages of my invention resides in the fact that the zone or band of compressed metal is substantially flat and has a width which is sufficient to permit the thickness of the compressed metal zone to be easily and quickly gauged at all points. Hence, the slightest unevenness of the compressed metal zone may be quickly detected and is open to immediate remedy, and by reason of the perfect control thus afforded, the zone of compressed metal may be safely reduced to the optimum so that the tearing section can be easily severed by hand pulling without the use of a key or the like means providing leverage.

In order to open a container having a tear strip or section produced in accordance with the present invention, a pull member is spot welded, soldered, riveted, or otherwise secured to one end of the strip in such a manner that when pulled outwardly, the hardened metal is fractured so that the tear strip or section may be torn from one end to the other along the zone of compressed metal, the entire operation being performed with ease and in a fraction of a second.

Further objects and advantages will be apparent from a consideration of the following description and accompanying drawings which show different embodiments of the invention chosen for the purpose of illustration.

In the drawings:

Fig. 1 is a plan view, on a reduced scale, of a metal blank used in making a cover or end wall of a container;

Fig. 2 is a side elevation of the blank shown in Fig. 1;

Fig. 3 is a sectional view of the blank interposed between a set of dies used in forming a tear strip in accordance with the present invention;

Fig. 4 is an enlarged fragmentary section of the dies shown in Fig. 3, illustrating the shape and arrangement of the parts operative to effect a compressive or swaging action on the interposed blank;

Fig. 5 is a view similar to Fig. 3, but showing the dies in closed position;

Fig. 6 is an enlarged fragmentary section, similar to Fig. 4, illustrating the action of the dies in forming the tear strip and bands of compressed metal;

Fig. 7 is an enlarged fragmentary section of a cover having a tear strip formed by the dies shown in Figs. 3 to 6;

Fig. 8 is an enlarged fragmentary section illustrating the action of a set of dies of modified construction;

Fig. 8a is a view similar to Fig. 8, illustrating a further modification;

Fig. 9 is a top plan view of a cover formed in accordance with the present invention;

Fig. 10 is a sectional view of the cover with one type of pull member secured to one end of the tear strip;

Fig. 11 is a top plan view of the cover having a pull of modified form;

Fig. 12 is a perspective view showing the upper end of a container provided with a cover having a tear strip formed in accordance with the present invention and with a pull member attached;

Fig. 13 is a perspective view illustrating the manner of effecting the initial tear or rupture of the tear strip;

Fig. 14 is a view similar to Fig. 13 but illustrating the tear strip partially torn away from the cover;

Fig. 15 is a perspective view showing the appearance of the container when the tear strip is completely torn;

Fig. 23 is a top plan view of the end or cover of a container having a tear strip provided with another type of pull member;

Fig. 24 is a perspective view of the pull member shown in Fig. 23;

Fig. 25 is a perspective view showing a key or grip in position about the pull member;

Fig. 26 is a section on the line 26—26 of Fig. 25;

Figs. 27 and 28 are perspective views showing a pull member and grip of modified form;

Fig. 29 is a fragmentary elevation showing a pair of milling rolls for forming a tear strip in the side wall of a container or the depending flange of its cover;

Fig. 31 is a perspective view of a partially formed container having a tear strip formed in its side wall;

Fig. 32 is an elevation of the completed container;

Fig. 33 is a fragmentary section of the container shown in Fig. 32;

Fig. 34 is a perspective view of a key or grip for use with the container shown in Fig. 32; and Fig. 35 is a perspective view showing a tear strip formed in an elongate piece of metal adapted to be attached to a non-metallic container so as to provide a seal.

Figure 16:
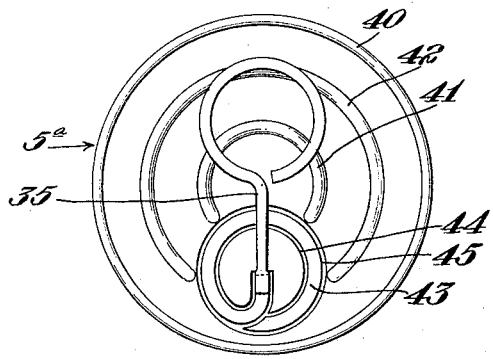
Figs. 16, 17 and 18 are top plan views of covers having tear strips of different shapes and arrangements.

Referring to Figs. 1 and 2, the numeral 1 designates a blank stamped from a piece of tinned sheet iron or the like stock which is relatively soft, tough and readily deformable, having a thickness of about 0.01 inch and a grain designated by the lines 2, the size and shape of the blank depending upon that of the container to which the completed cover is to be attached.

Where, as here shown (Figs. 9 and 10), it is desired to form a dished cover 5 having reinforcing corrugations 6, a peripheral flange 7 providing, in effect, an outer reinforcing rib adapted to be crimped about the upper end of a cylindrical container, and an annular tear strip 8 which extends about the margin of the cover between the outer reinforcing corrugation 6 peripheral flange 7, terminating in an inwardly extending end 9, the blank is subjected to the action of a pair of coining or stamping dies 11 and 12 (Figs. 3 to 6) which are operative not only to form the reinforcing corrugations 6 and peripheral flange 7, but also to compress spaced gaugeable bands or zones of the metal so as to define the tear strip 8. To this end the upper die 11 is formed with a depending annular rim or projection 15 conforming to the contour of the flange 7 of the cover, a central depression 16, and an intermediate depending rib 17 in the form of an interrupted circle whose ends are spaced apart a distance greater than the width of the inwardly extending end 9 of the tear strip, the annular zone 18 between the rim 15 and rib 17 being perfectly flat, as shown more clearly in Figs. 4 and 6.

The lower die is formed with an inwardly extending annular depression 21 which is complementary to the rim 15, a substantially annular depression 22 which is complementary to the rib 17, and an outwardly projecting boss 23 complementary to the depression 16. The portion of the die 12 opposed to the zone 18 of the die 11 is provided with a substantially annular recess 25 formed between a pair of spaced outwardly extending shoulders 26 and 27, the shape of the recess and shoulders conforming to that of the tear strip to be formed in the cover. The outer surface of each shoulder is perfectly flat and the distance between the shoulders is preferably of the order of 0.1 inch, although a greater or lesser width will produce satisfactory results, the optimum width depending upon the diameter or size of the area enclosed by the tear strip. The width of each shoulder is preferably of the order of 0.020 inch and in any case the flat surfaces of each shoulder should be wide enough to allow easy gauging of the compressed metal zone, and to produce a swaging action, in contradistinction to a shearing or cutting action such as would be produced were the outer edges of the shoulder tapered or pointed as in scoring or cutting dies. The shoulders 26 and 27 project outwardly from the inner wall of the recess a distance sufficient to compress the metal blank so that its thickness will be reduced by approximately one-half or more, depending upon the thickness of the metal sheet used. For example, with a blank having a thickness of the order of 0.01 inch, the shoulders 26 and 27 may be spaced apart a distance of approximately 0.1 inch and project outwardly from the inner wall of the recess 25 a distance sufficient easily to make an impression from about 0.005 inch to 0.007 inch, in which case the metal on each side of the tear strip 8 is compressed to a thickness of 0.003 inch to 0.005 inch, when the original thickness of the metal is about 0.01 inch.

In forming the cover 5, the blank 1, or stock from which the cover is to be made, is inserted between the dies 11 and 12 so that the inwardly extending end 9 of the tear strip is aligned with the grain 2 (Fig. 1) of the metal, and a single actuation of the dies is all that is required. During the operation the annular zones of metal lying between the surface 18 of die 11 and the shoulders 26 and 27 of the die 12, are subjected to a coining treatment which effects a compression of the metal, as shown in Fig. 6, and as a result of this treatment the parallel bands or zones of metal 30 and 31 lying above the shoulders 26 and 27, are physically altered and become hard and dense, having a bursting and tensile strength not substantially less, if any, than that of the unaltered metal, but a tearing strength which is considerably less than that of the unaltered metal.

Although desirable, it is not essential that the walls of the recess 25 be perpendicular, as shown in Figs. 3 to 6, and if desired these walls may slope outwardly and the recess 25ª may be slightly rounded, as indicated in Figs. 8 and 8ª, in which case the zones 30 and 31 on each side of the tear strip 8 will still be compressed in the same manner as above described. However, as there may be an appreciable displacement of metal, it is desirable to allow for such displacement by making the depth of the recess slightly greater than the thickness of the tear strip, in which case the tear strip 8 is permitted to bulge slightly, conforming substantially to the contour of the recess, as shown more clearly in Figs. 8 and 8ª, thus avoiding any compressive action on and consequent hardening of the tear strip.

The dies 11 and 12 are so designed that the rim 15 and rib 17, which form the peripheral flange and reinforcing corrugations on the cover, are carried by the die 11, and the shoulders 26 and 27, which form the tear strip, are carried by the die 12 and project outwardly beyond the adjacent surfaces of the die. This arrangement is particularly advantageous as the shoulders 26 and 27, being unobstructed, may be ground or resurfaced by an ordinary grinding machine when they become worn.

Referring to Figs. 9 to 12, the entire tear strip 8 is completely surrounded by the bands of compressed metal 30 and 31, and both the tear strip and the zones or bands of compressed metal extend about the margin of the cover between the outer corrugation 6 and the peripheral flange 7, and terminate in an inwardly directed end which is spaced from the other end of the tear strip 8 a distance sufficient to provide a narrow strip 33 of the unaltered metal, the utility of which is pointed out hereinafter.

A pull member 35 is spot welded to the inner end 9 of the tear strip and extends diametrically across the cover, as shown in Figs. 10 to 12. The pull preferably consists of a single piece of heavy wire, one end of which is bent to provide a loop 36 through which a finger may be inserted. The opposite end of the pull is flattened, as shown at 37, and its under surface is provided with a plurality of nibs 39 which contact the end 9 of the tear strip, the nibs 39 holding the shank of the pull 35 spaced from the surface of the cover, as shown in Fig. 10, thus ensuring an accurately located spot welded joint by avoiding any electrical contact other than between the nibs 39 and the end 9 of the tear strip. If desired, the pull may extend substantially the entire distance across the cover, as shown in Fig. 12, or part way across with the loop 36 overlying the center of the cover, as shown in Fig. 11.

In order to avoid any danger of the end of the pull severing the tear strip when pulled upwardly, as shown in Fig. 13, its outer end may be rounded as shown at 40 in Figs. 10 and 13, and to facilitate grasping the pull, the end of the loop 36 may be bent upwardly, as illustrated in Figs. 10, 12 and 13.

The cover with the pull attached may be applied to a container C and permanently secured thereto in the usual manner. In opening a container having a cover embodying my invention, the pull is merely lifted up or pulled away from the cover, and by simply continuing the pulling of the member 35 away from the container, the tear strip 8 may be torn away from the cover from one end to the other, as shown in Figs. 13, 14 and 15, the entire operation requiring but one pull. When the tear strip has been torn from one end to the other, the body of the cover is not wholly severed from the rim, since the connecting strip 33 provides, in effect, a hinge which not only prevents the cover from dropping into the container, but permits the partially severed body to swing upwardly as shown in Fig. 15, thus exposing the interior of the container C and permitting its contents to be emptied without further manipulation of the tear strip or partially severed body portion of the cover. If desired the cover may be so formed that both its body portion and tear strip may be completely torn off, as shown in Figs. 16 to 18, 20 and 21.

Figure 17:
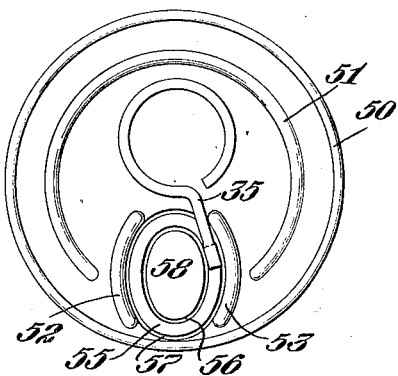
Figure 18:
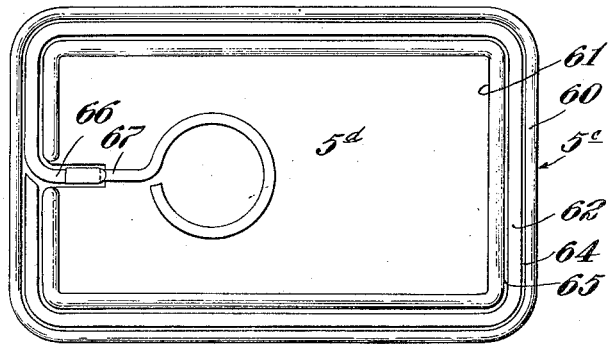
Figure 19:
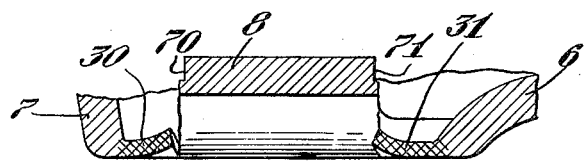
Fig. 19 is a view, similar to Fig. 7, but showing the line of tear or rupture of a tear strip formed in accordance with the present invention.

Although the embodiment above described is particularly useful for containers holding solid or semi-solid materials, the parts may be modified in accordance with the particular use for which the container is to be put, and in Figs. 16 to 18, I have shown further illustrations of covers embodying modified arrangements of the tear strip. The covers shown in Figs. 16 and 17 are designed for use with containers for liquids, and in each of these embodiments the tear strip surrounds a relatively small area adjacent to the rim of the cover.

Referring to Fig. 16, the cover 5ª is formed with the usual peripheral flange 40, struck up inner and outer reinforcing ribs 41 and 42 which extend part way around the cover, and a circular tear strip 43 located between the center of the cover, the ends of the reinforcing ribs and the peripheral flange. The tear strip 43 is surrounded by bands 44 and 45 of compressed metal formed in the manner above described and one end of the tear strip 43 extends inwardly and is spot welded to a pull 35 as in the embodiment shown in Figs. 10 and 11. In this particular embodiment the bands of compressed metal 44 and 45 which surround the opposite end of the tear strip merge with the compressed metal band 45 which extends along the inwardly extending end of the tear strip, so that the tear strip and circular area enclosed thereby may be completely torn away from the cover.

In the embodiment shown in Fig. 17, the cover 5b is provided with a peripheral flange 50, a reinforcing rib 51 which extends part way around the cover, a pair of radially extending arcuate reinforcing ribs 52 and 53 struck up between the ends of the rib 51, and an oval-shaped tear strip 55 bounded by bands 56 and 57 of compressed metal which completely surround removable section 58. A pull 35 is spot welded to the tear strip 55 and is disposed substantially tangentially to the section 58.

The embodiment shown in Fig. 18 illustrates a cover 5d for containers having a rectangular cross section, such, for example, as sardine cans. In this embodiment, the cover 5d is provided with a peripheral flange 60, a reinforcing rib 61 and a tear strip 62 bounded by bands 64 and 65 of compressed metal, the tear strip extending completely about the marginal portion of the cover between the flange 60 and reinforcing rib 61 and terminating in an inwardly extending end 66 to which a pull tab 67 is spot welded, as in the previously described embodiments. In this embodiment the compressed metal bands 64 and 65 merge adjacent to the end 66 of the tear strip 62, thereby permitting the body of the cover 5d to be torn away from its rim together with the tear strip.

Figure 20:
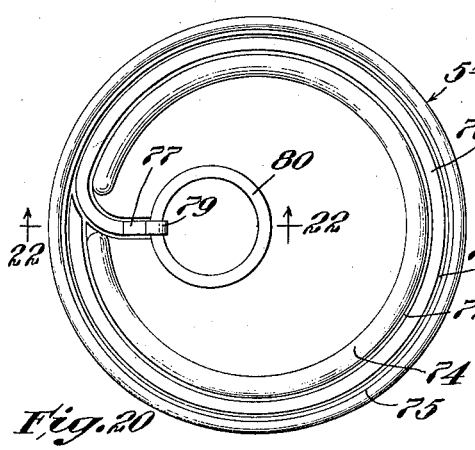
Figs. 20 and 21 are top plan views illustrating different arrangements of the tear strips and showing a pull member of modified form.
Figure 21:
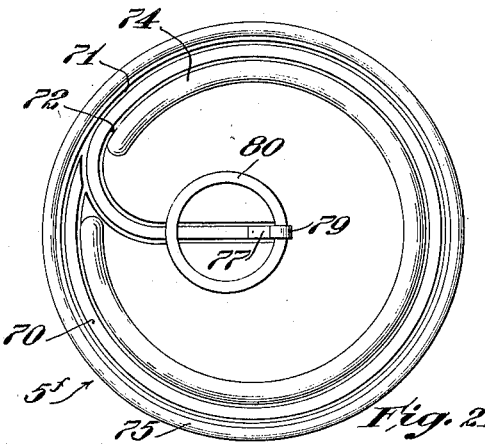
Figure 22:
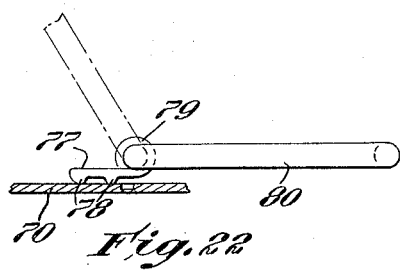
Fig. 22 is an enlarged fragmentary section on the line 22—22 of Fig. 20.

In the embodiment shown in Figs. 20 and 21, the covers 5e and 5f are provided with tear strips 70 bounded by bands of compressed metal 71 and 72 formed between a reinforcing rib 74 and the peripheral flange 75, and one end of the tear strip either may extend part way into the body of the cover, as shown in Fig. 20, or extend to approximately the center of the cover, as shown in Fig. 21. In either case a pull member is spot welded or otherwise secured to the inner end of the tear strip, the pull member consisting of a piece of metal 77 having on its under surface a plurality of nibs 78 contacting the tear strip 70. The inner end of the pull 77 is bent to form a hinge socket 79 which receives a pull ring 80 adapted to be swung outwardly so that a finger may be readily inserted, as illustrated in Fig. 22.

In the previously described embodiments the pull member and grip ring are shown integral with or permanently secured to each other, but if desired these parts may be made separable, as shown, for example, in Figs. 23 to 28. In the embodiment shown in Figs. 23 to 26, the pull member 91 consists of a single piece of metal, one end of which is provided on its under surface with nibs 92, and its opposite end is shaped to provide a dove-tail 93 which is spaced above the body portion of the cover 5e, it being understood that the pull member is spot welded or otherwise secured to the inner end of the tear strip 17 as in the previously described embodiments. The key or grip 94 consists of a piece of heavy wire or the like, shaped to provide a handle 95 at one end and its opposite end is secured to a socket-like member 96 adapted tightly to fit about the dove-tail 93, as shown in Figs. 26 and 27, so that it can be pulled away from the cover as above explained. After having torn the tear strip from the cover, the grip 94 may then be detached from the pull and set aside for later use.

In Figs. 27 and 28, I have illustrated another modified form of pull and grip members, the pull member 91a being similar to that shown in Figs. 23 to 26, except that in place of the dove-tail end 93, I provide a slotted end 93a, and the key or grip 94a is provided at one end with a loop 95a and at its opposite end with a hook 96a adapted to be inserted in the slot in the end 93a of the pull member. The manner of using this modified form is substantially the same as that above described.

In each of the previously described embodiments the tear strip is formed on a substantially flat cover or wall of the container, but if desired the tear strip may be formed on a curved wall of either the container or its cover, and to this end a pair of milling rolls, such as are shown in Fig. 29, may be used. One of the rolls, here shown as the lower roll 100, is provided with a plain peripheral surface, and the other roll 101 is provided with a pair of spaced parallel ribs or flanges 103 and 104 which define an intermediate recess 105. The lower roll 100 corresponds to the die 11, its peripheral surface providing the functional equivalent of the area 18 of the die 11, and likewise the roll 101 corresponds with the die 12, the ribs 103 and 104, and the recess 105 corresponding respectively with the shoulders 26 and 27, and the recess 25 of die 12. The peripheral surfaces of the rolls 100 and 101 are spaced apart a distance equal to the thickness of a sheet metal blank 106 to be operated upon, and the relationship between the surface of roll 100, the ribs 103 and 104, and the recess 105 is substantially the same as that between the corresponding parts of the dies 11 and 12, which has been previously explained. In order to accommodate different thicknesses of metal, as well as both blanks and completed containers or covers, one or both of the rolls may be adjustably mounted so that the distance between their peripheral surfaces may not only be varied, but a container or cover may be inserted and removed from between the rolls.

Figure 30:
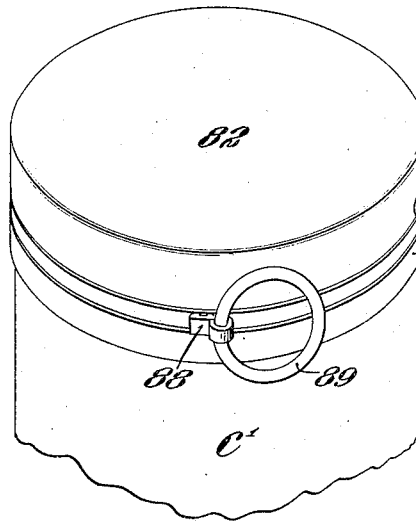
Fig. 30 is a perspective view of the upper end of a container having a tear strip extending about the overlapping flange of its cover.

In Fig. 30, I have shown a container C¹ provided with a cover 82 having a tear strip formed on its depending flange 83, the lower part of which may have a pressed or interlocking fit about the wall of the container. The bands of compressed metal 84 and 85 and the intervening tear strip 86 extend completely about the flange 83 and a pull member 88, having a pull ring 89, is secured to the tear strip 86, as in the embodiment shown in Figs. 20 and 21, the pull ring 89 preferably being bent so as to conform to the curvature of the flange 83. The tear strip 86 may be completely torn from the flange 83, leaving the lower end of the flange about the container and permitting the remainder of the cover 82 to be removed and replaced.

In Figs. 30 and 31, I have shown a container C² having a tear strip formed in its side wall. In making this container a substantially rectangular blank 106 is subjected to the action of the milling rolls 100 and 101 so as to form spaced bands of compressed metal 110 and 111 and an intermediate tear strip 112 about its upper end, and one end or edge of the blank may be trimmed down so as to leave one end of the tear strip projecting outwardly, thus providing a tongue 114, as shown in Fig. 31. The blank 106 may then be rolled or shaped and an inner collar 115 (Fig. 33) and end walls 116 may be assembled therewith, and the parts then secured in a manner well known to those skilled in the art, thereby providing a container C² having a tear strip which encircles its upper end portion and terminates in a tongue 114 which may be readily attached to or inserted in a slot 117 of a pull member 118 (Fig. 34) so that the tear strip may be torn away from the container. When the tear strip has been completely torn away, it separates the body portion of the container from its upper end which provides a cover capable of being removed from and replaced about the inner collar 115.

Although each of the above embodiments shows a tear strip integral with the side wall or cover of a metal container, it is to be understood that this invention is not limited to metal containers, for if desired a tear strip may be formed in a piece of metal or the like material which may be applied or permanently attached to non-metallic containers so as to connect separable parts thereof, or to provide a breakable seal connecting separable portions or flaps of a fiber board carton or the like. For example, in Fig. 35, I have shown a pair of spaced bands 120 and 121 of compressed metal defining a tear strip 122 formed in an elongate strip of metal 124 having along its edges prongs 125 which are adapted to be clenched into adjoining flaps or marginal portions of a non-metallic container. One end of the strip 124 may be trimmed so as to provide a tongue for the tear strip 122, as in the embodiment shown in Fig. 32, or a pull member may be secured to the tear strip, as in the embodiment shown in Figs. 10 to 27.

It will be noted that in each of the embodiments above described the tear strip consists of a band of the physically unaltered metal which possesses a relatively high tearing strength, and that on each side of the tear strip there is formed a continuous gaugeable band or zone of the physically altered metal which is relatively hard and dense, and hence capable of being readily torn. Where, as shown for example in Fig. 19, the tear strip 8 is provided with side walls 70 and 71 which are substantially at right angles to the upper surfaces of the compressed metal zones 30 and 31, as compared with the tapered or rounded corners at the junctions of the zones of compressed metal with the peripheral flange and reinforcing rib, the fracture and line of tear usually occur adjacent to the walls 70 and 71. As the metal on both sides of the zones 30 and 31, i. e., the metal of the flange 7, tear strip 8 and rib 6, is in its original condition, characterized by a substantially greater tearing strength than that of the zones 30 and 31, there is no liability of the line of tear deviating from the zones 30 and 31, and due to the relatively sharp angle between the tear strip and zones 30 and 31, such line of tear occurs close to the tear strip 8. Accordingly, it requires but a slight force to tear the strip 8 and there is no danger of breaking the tear strip in opening the container when the tear strip is of the proper width.

A further feature of the invention resides in forming one or more reinforcing ribs either along the zones of compressed metal, as shown in Figs. 9 to 12, and 17 to 23, or at such locations as will hold the cover or wall of the container relatively stiff while the strip is being torn, as shown in Fig. 16.

While I have shown and described different desirable embodiments of the invention, it is to be understood that this disclosure is for the purpose of illustration, and that various changes in shape, proportion and arrangement of parts, as well as the substitution of equivalent elements for those herein shown and described may be made without departing from the spirit and scope of the invention as set forth in the appended claims.

I claim:

1. A container of the kind wherein one wall has an integral tear strip bordered by bands of work-hardened material thinner than the tear strip but of substantially uniform thickness and with substantially plane and parallel upper and under surfaces, and wherein a pull element is permanently united to the tear strip, characterized in having a sealing bead whose inner wall is integrally joined to one edge of one of said bands, and a reinforcing bead, one of whose walls is integrally joined to one edge of the other band, the junctions of the respective bands with the tear strip being more definitely angular and so more easily fractured than those between the bands and the respective beads, whereby the tear strip, when subjected to pull, tends to break away from both bands leaving the bands attached to the beads.

2. A container having a wall provided with a tear strip capable of being torn by a simple hand pull, said wall comprising a piece of sheet material having within its confines spaced parallel bands of compressed metal of reduced tearing strength, said bands defining an intermediate zone of relatively soft metal constituting a tear strip adjoining said bands, the junction of one band at least with the adjacent longitudinal edge of said tear strip defining a relatively sharp angle as compared with the unaltered metal along its other longitudinal edge so that, when the tear strip is torn from said wall, the line of tear follows the relatively sharp angle closely adjacent to said first-named longitudinal edge of the tear strip and the material of said last-named band is caused to bend in the direction of the pulling force, so as to present a relatively smooth outwardly curved margin, and a pull member integrally secured to said tear strip, said pull member being constructed and arranged so that it may be pulled outwardly from said wall to start a tear which continues along said bands by a simple hand pull.

3. A container of the kind wherein one wall has an integral tear strip bounded by lateral relatively narrow bands of work-hardened material, the tear strip being of substantially the same thickness as the body of said wall and the bands of work-hardened material being thinner than the tear strip but of substantially uniform thickness and having substantially parallel top and bottom surfaces, characterized in that said tear strip lies between a pair of relatively elevated protecting ribs with which said bands directly merge, one of said ribs having therein a gap, a portion of the tear strip together with its border bands of work-hardened material extending through said gap, and a tear strip actuating element permanently secured to that portion of the tear strip which extends through said gap.

4. A container of the kind wherein one wall has an integral tear strip which closely follows the contour of the periphery of said wall and wherein said tear strip is bordered by relatively narrow bands of work-hardened material thinner than the tear strip but of substantially uniform thickness and having substantially parallel inner and outer surfaces, characterized in that an integral continuation of one end of the tear strip with its bordering bands curves inwardly in a smooth arc toward the mid-portion of said wall and in that a pull element is permanently secured to said inwardly directed portion of the tear strip and normally closely overlies the mid-portion of the wall where it is readily available for seizure, said pull element comprising a handle portion and a stiff shank portion, the end of the shank portion curving away from the surface of the tear strip so as to avoid breaking the tear strip as the handle is moved away from the wall, whereby the line of tear resulting from simple continuous hand pull exerted on the pull element and away from the outer surface of the wall is initiated at said inwardly directed portion of the tear strip, and following uninterruptedly along said arc continues along the main portion of the tear strip to the other end of the latter.

EDWIN F. M. SPEIDEL.